Patented Sept. 22, 1931

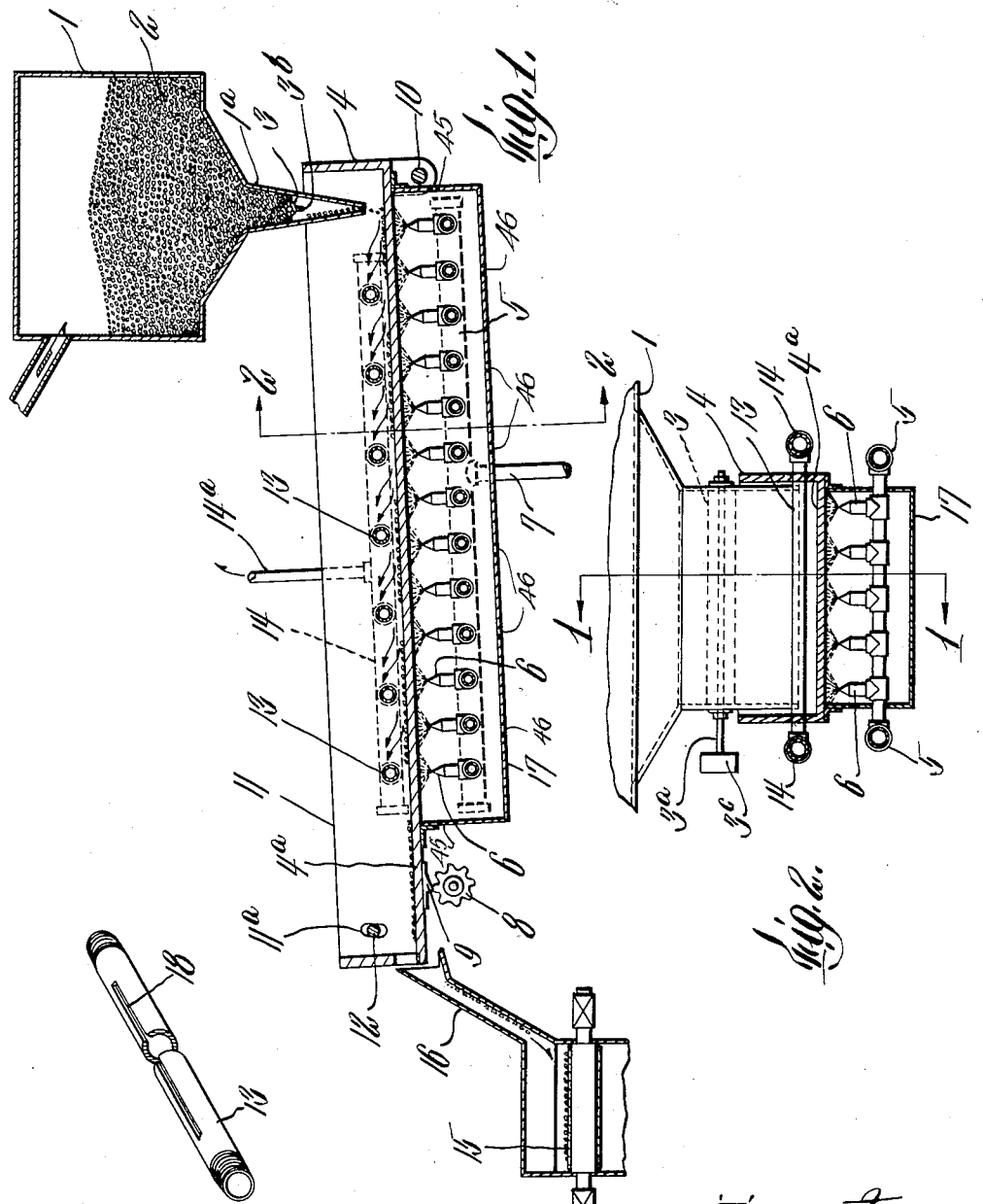

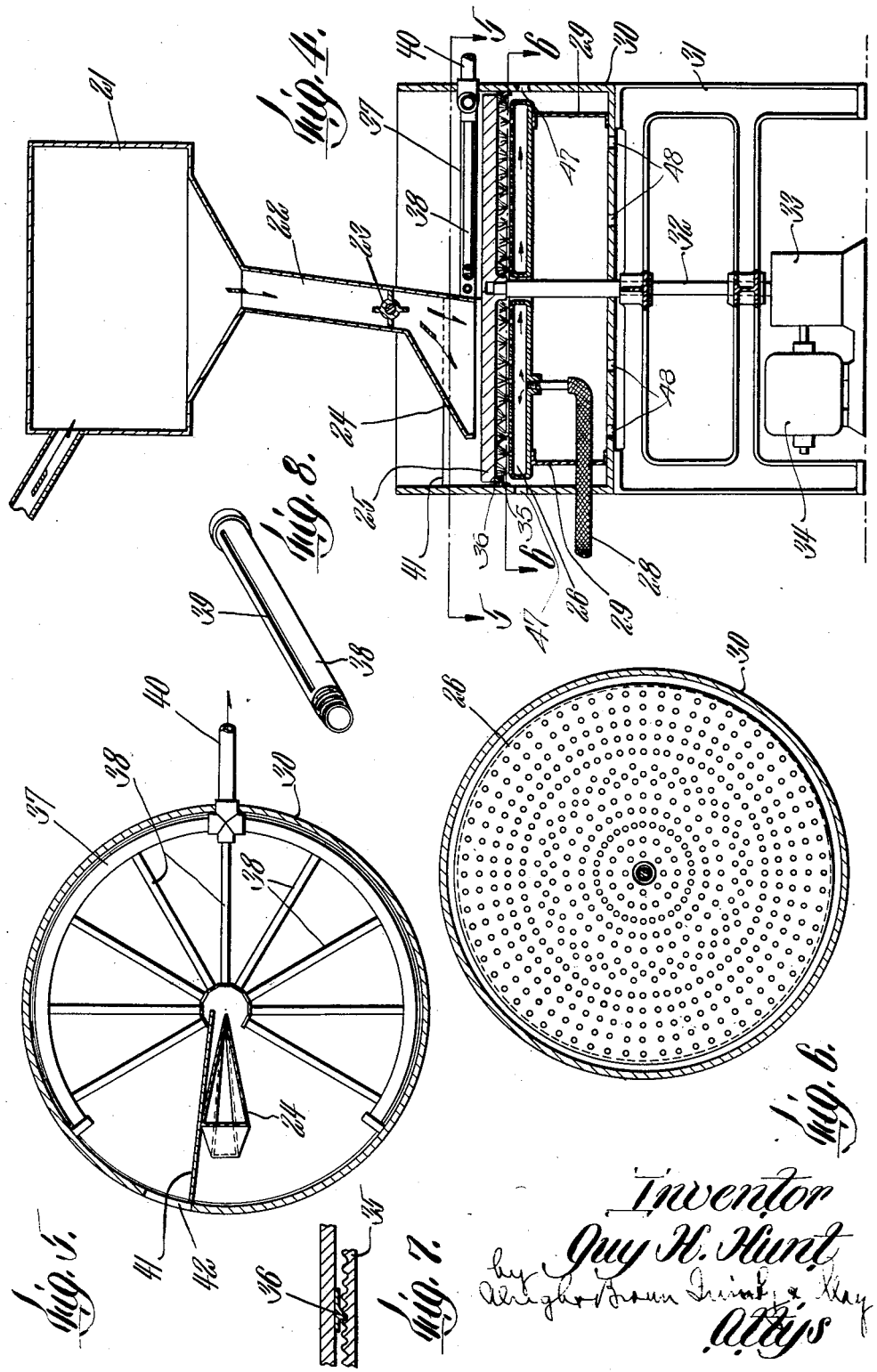

1,824,351

UNITED STATES PATENT OFFICE

GUY H. HUNT, OF BROOKLINE, MASSACHUSETTS

METHOD OF PRODUCING LIME

Application filed December 2, 1926. Serial No. 152,141.

This invention relates to the production of lime, and has for its object the production of a high grade lime by a continuous and economical method.

Lime is commercially produced by the decomposition of limestone rock at an elevated temperature, in kilns, such decomposition frequently being termed "burning" or "calcining." The limestone rock is obtained from limestone quarries by drilling and blasting, and as thus obtained varies in size from pebbles to large boulders. The boulders are disintegrated, as by man-wielded sledges or by mechanical breakers, to pieces of more or less uniform size, approximating that of a man's head, for calcination in vertical kilns. When prepared for calcination in rotary kilns, the rock is disintegrated to approximately marble size.

A vertical kiln consists of a cylindrical shell about 40 to 60 feet in height, and about 10 to 15 feet in diameter. The rock is charged at the top of the kiln and as it passes slowly down therethrough, is heated to a sufficiently elevated temperature and for a sufficient period to cause its complete decomposition into lime, which is withdrawn from the bottom of the kiln. The necessary heat is supplied from fire boxes surrounding the kiln at its bottom portion, and from which the products of combustion are passed through the kiln in contact with the rock. In operating the kiln, a temperature of from about 1600° to 2000° F. is maintained at its bottom portion to complete the decomposition of the limestone into lime. There is, therefore, a temperature gradient from the bottom of the kiln (whereat a maximum temperature exists) to the top of the kiln (whereat the cold charge is fed and a minimum temperature exists). The time of passage of the charge from the top to the bottom of the kiln is about thirty hours, or so, and the operation is continuous.

A rotary kiln consists of a slightly inclined cylindrical shell, usually 100 feet in length and 8 to 10 feet in diameter. The shell is revolved slowly as the charge (broken to about marble size) is passed therethrough from its upper to its lower end, in direct contact with products of combustion produced by fire at its lower end, which maintains a temperature gradient from the lower end to the upper end about equal to that maintained in a vertical kiln. Because of the smaller size of rock employed in the rotary kiln, complete decomposition may be effected in a considerably shorter period,— usually about eight hours. The rotary kiln, however, is usually considered less desirable than the vertical kiln, as its initial and maintenance costs are higher. Its field of application is usually confined to the calcination of lime of a weak, crystalline structure, as such limestone tends to crumble when subjected to the load pressure existing in vertical kilns, and thus to clog up the draft passages through the charge, necessary for supporting combustion.

There are certain disadvantages inherent in the kiln method of lime production which will hereinafter be discussed in order better to appreciate the results accomplished by the present invention. Thus, the production of lime in kilns can be successfully performed only upon lime rock of definite size. The so called quarry "chips" or "spalls", which are below such definite size, although amounting to about 20% to 30% of the rock blasted and thus figuring in production costs, are usually discarded as unfit for lime production. Also, because of unavoidable variation in the size of rock fed to the kiln, non-uniform calcination takes place. Thus, the smaller pieces may be overburned, i. e., side reactions of the lime with impurities present in the lime rock may take place, resulting in inert vitreous reaction products having no slaking characteristics. On the other hand, the larger pieces may be incompletely burned, and contain cores of undecomposed limestone, which also have no slaking properties. Also because the kiln must be maintained under suitable draft, its size, design and construction depend largely upon this feature, and the size of the charge is predetermined by this requirement. Such being the inherent demand in respect of draft, other important features which affect quality and production are sometimes subordinated or omitted from consideration.

The carbon dioxide which is liberated during decomposition of the rock produces in the gas phase a pressure of carbon dioxide, which impedes decomposition and hence necessitates higher temperature for complete decomposition, since, if insufficiently high temperature were employed, incomplete decomposition would result. This condition is aggravated because the gas phase not only contains the carbon dioxide resulting from decomposition, but also carbon dioxide contained in the products of combustion which are passed through the kiln. Also, higher temperature is necessary in order to decompose the interior portions of the large pieces of rock and cause the carbon dioxide to be driven out. Owing to these conditions, the temperature which must be maintained to effect complete decomposition is usually so high as to result in side reactions and the production of undesirable vitreous products.

Furthermore, a large proportion of the fuel consumed in kiln production is wasted in maintaining lime already formed, at an elevated temperature for a long period. For instance, after the pieces of rock are introduced into the kiln, partial and complete decomposition into lime first takes place on the outer portions thereof. Lime rock, however, is a relatively poor heat conductor, so that a long heating is necessary before the pieces are heated to decomposition temperature throughout, as a result of which, although their outer portions may consist partly or completely of lime after a relatively short period of treatment, nevertheless such lime portions are maintained at elevated temperature until the pieces are uniformly heated and decomposed throughout into lime, when complete decomposition is effected, and consequently greater losses necessarily occur with the attendant expense.

Because of the highly elevated temperature and lengthy period of decomposition, the resultant lime acquires a more or less passive state, which manifests itself in slow hydrating and poor sand-taking qualities. The lime is also necessarily contaminated with the products of combustion which are conducted into direct contact therewith,—the extent of such contamination varying with the type of fuel and the conditions under which it is used. A high sulphur coal, for example, imparts a greenish color to the lime. Particles of charred wood, cinders, and the like, are likely to become incorporated into the lime, and incomplete combustion will soot it.

The product obtained from kilns contains pieces which vary in size from sand granules to large lumps. The lumps often contain uncalcined cores, and when treated with water evolve heat and produce steam as their outer portions are slaked. Such heat and steam tend to delay access of water to the interior of the lumps, to delay slaking, and also to produce side reaction products which produce an inferior mortar. This condition of affairs is recognized, as the specifications for preparing good mortar call for the preparation of a finely divided powder from the lime of commerce prior to slaking.

The present invention overcomes the ineluctable conditions which present themselves when lime is produced by the kiln method. Broadly stated, this is accomplished by uniformly disintegrating the lime rock prior to calcination, into small granules, and then calcining such granules in apparatus designed to heat and completely decompose such granules into lime, under minimum time and temperature conditions.

In accordance with the process of the present invention, the limestone granules are deposited in a substantially uniform, relatively thin layer, upon an indirectly heated support or table, and maintained thereon until complete decomposition has been effected, whereupon the granules are removed. To permit a continuous operation, the heated support may be of the circuitous type, and caused to move in a closed path under a substantially continuous shower of granules, the granules forming a layer, which is maintained on the support until decomposition into lime has been completely effected, whereupon the lime is removed from the support before its circuitous travel is completed, and the support is again moved under the shower of granules. Or a continuous operation may be maintained by showering the granules on a portion of a stationary table and causing motion of the granules on the table away from the shower, so as to free the heated surface for the deposit of other material,—the granules remaining on the heated table until complete decomposition into lime has been effected, whereupon they are removed therefrom.

While the granules are maintained on the heated table, provision is made to aid complete decomposition into lime at a minimum temperature and in a minimum period. This is accomplished by reducing the pressure of carbon dioxide in the gas phase adjacent to the granules. Under such conditions, complete decomposition may be effected at a lower temperature than that heretofore found necessary. Inasmuch as the granules are uniformly of small size, complete decomposition of such granules may be effected in a very short period, as such granules become uniformly heated to decomposing temperature throughout very rapidly. Preferably, also, the particles are so moved or jarred while undergoing decomposition as to expose fresh surfaces, thus facilitating the evolution and removal of the carbon dioxide and promoting uniform heating and decomposition.

With these and other objects in view, the invention consists in certain novel features of procedure, as well as of construction, combination and arrangement of parts, as will be more fully hereinafter described in conjunction with the accompanying drawings, wherein Figure 1 represents in vertical section, somewhat diagrammatically and conventionally, a form of apparatus having a stationary heating support.

Figure 2 represents a section on the line 2—2 of Figure 1.

Figure 3 shows in perspective an element of the carbon dioxide pressure-reducing system.

Figure 4 illustrates a vertical section through a form of apparatus having an endless heating support or table.

Figure 5 is a plan view of the same.

Figure 6 represents a section on the line 6—6 of Figure 4.

Figure 7 is a detail section showing a portion of the jarring means used in the modification shown in Fig. 4.

Figure 8 shows in perspective an element of the carbon dioxide pressure-reducing system.

Referring to Figure 1 of the drawings, 1 indicates a bin in which is maintained a supply of limestone granules of, say, such a size as will pass through a three or four mesh screen. The bin 1 is located above a stationary chute 4 whose slightly inclined bottom 4a is heated on its under side. The granules gravitate from the bin through a hopper 1a provided with a valve 3 therein, which permits a predetermined quantity of granules to be substantially continuously showered on to the upper portion of the chute to form a substantially uniform, relatively thin lay thereon. As shown, the valve 3 is a rotary valve, consisting of a shaft 3a provided with a series of regularly spaced, longitudinal radial vanes 3b, between which predetermined quantities of granules are caught from the bin, and which then discharge such granules from the hopper on to the chute. One end of the shaft 3a passes through a side wall of the hopper and has affixed thereto a pulley 3c, by means of which it may be rotated by a belt from a countershaft or motor (not shown), to produce the proper rate of discharge of granules on to the chute. The chute which may be made of any suitable heat-conducting, refractory material, may be heated from below by any suitable heating means. As shown, the heater comprises uniformly spaced rows of nozzle burners 6, extending transversely in an enclosure 17, which is preferably made of heat-insulating material so as to prevent heat loss, and from which the products of combustion pass through apertures 45 in the side walls of the enclosure. Suitable openings 46 are provided through the bottom of the enclosure to allow the entrance of air to support combustion. The nozzles are supplied with fuel, e. g., oil or gas, under suitable pressure, from mains 5 positioned longitudinally outside of the enclosure, and cause a substantially continuous sheet of flame to play on the under side of the chute. The layer of granules showered on to the chute is subjected to vibration or jarring, to promote uniform heating and decomposition thereof into lime, and in addition to produce a substantially continuous downward motion toward the lower end of the chute. As shown, agitation of the chute is effected at its lower end by a rounded tooth gear 8, which is continuously rotated and caused to strike against a hardened steel, cam-shaped piece 9, fixed to the chute. To permit such vibration, the chute is pivoted at its upper end, as at 10,— a bolt 12 passing through a guiding slot 11a in a side wall 11 of the chute, preventing it from working up or down beyond predetermined limits, but permitting adjustment of its angularity.

The granules progress gradually down toward the lower end of the chute, and are gradually decomposed into lime, with the evolution of carbon dioxide. The pressure of carbon dioxide in the gas phase adjacent to the granules may be reduced, as by exhausting the gas phase or by sweeping it with fresh air. This is accomplished by a series of pipes 13 extending transversely of the member immediately above the granules, and longitudinally slotted through their sides, as at 18, to provide openings through which the evolved gases are preferably exhausted; although, if desired, fresh air may be admitted therethrough to sweep the gas phase immediately above the granules. The pipes 13 may be fitted into a pair of mains 14, which communicate through pipe 14a with an exhaust chamber or pump (not shown). The granules, upon reaching the lower end of the chute, have been completely converted into lime, and may be conducted from the lower end of the chute through a chute 16 on to a belt conveyor 15, which may serve to convey the lime to a storage bin.

Employing the method and apparatus hereinbefore described, a complete decomposition of the granules into lime will be effected in a short period and at relatively low temperatures. Thus, in actual practice, the granules may be completely decomposed in from five to ten minutes and at temperatures of from 1100° F. to 1300° F. The resulting lime is free from overburned and underburned pieces, is of uniformly small size, and possesses optimum slaking properties.

Figure 4 illustrates a modified form of apparatus, wherein a heating support in the form of a horizontal circular rotary table 25 is employed. The limestone granules are maintained in a storage bin 21 above the table, from which they gravitate into a chute 22 provided with a rotary valve 23, which permits predetermined quantities of granules to pass thereby into a distributing hood 24, which substantially continuously showers granules so as to form a uniform relatively thin layer on the table. Inasmuch as the linear velocity of the table is gradually greater towards its circumference, the hood is of V-section, gradually increasing in width toward the circumference of the table to correspond to the gradually increasing linear velocity, and serves to shower a layer of uniform thickness on the table. The table is fixed to the upper end of the vertical shaft 32, by which it may be rotated at the desired rate, through a change gear box 33 at the lower end of the shaft, as by a motor 34.

The table may be heated from below by suitable heating means, as by a hollow circular jet burner 26, which may be supplied with liquid or gaseous fuel under suitable pressure by a supply pipe 28 communicating with its interior, and which plays a substantially continuous flame on the under side of the table. The burner is shown as supported on brackets 29, stationed on the bottom of a drum 30, which is preferably made of heat-insulating material, and constitutes an enclosure for the heater and its products of combustion. The products of combustion pass from the interior of the drum through suitable openings 47 in its side walls. Suitable openings 48 are shown through the bottom of the drum to permit the entrance of air into the interior of the drum to support combustion. The drum 30, as shown, is supported on a frame 31 resting on the floor.

The table is vertically vibrated or jarred so as to promote uniform heating and decomposition of the granules and also to expose fresh surfaces to facilitate the evolution of carbon dioxide. For this purpose, as shown in Fig. 7, a circular rack 35 may be fixed to the sides of the drum 30, and against the teeth of this rack strike cam-shaped, hardened steel pieces 36, fixed at intervals to the bottom of the table adjacent to its circumference. As the layer of granules is carried around the table and jarred, provision is made to reduce the carbon dioxide pressure in the gas phase adjacent thereto. For this purpose, arranged immediately above the table, near its circumference, is a semi-circular pipe 37, carrying a series of radially-extending pipes 38, capped at their inner adjacent ends and each provided with a longitudinal slot 39 through its side, through which the gas phase adjacent to the granules may be exhausted into the circular pipe and thence through a main 40 to a suitable exhaust chamber or pump (not shown). Or, if desired, fresh air may be passed through the slots into the gas phase to reduce the carbon dioxide concentration therein. As the limestone granules are carried around the table and vibrated, their complete decomposition into lime is to be effected in less than a single revolution of the table, so that the lime may be removed before again reaching the depositing station. As shown, a scraper 41, arranged in front of the funnel 24, scrapes the lime from the table and guides it outwardly through a slot 42 formed through the wall of the drum, and thence to a conveyor or storage bin (not shown).

The table may be rotated at a rate ensuring complete decomposition of the granules before reaching the scraper, as for example, about one revolution in five to ten minutes, the particular rate depending on the fineness of the granules, the temperature of the table, and certain other factors which affect rate of limestone decomposition.

Employing a process and apparatus such as hereinbefore described, a product of optimum slaking and causticizing characteristics and free from contaminations due to decomposition treatment is produced. As the period of decomposition is short, a relatively small amount of limestone is present in the apparatus at any time, so that the apparatus may be operated for a short period, say, eight hours, without excessive loss of heat such as would occur if kilns were so operated.

It should be evident that a process such as hereinbefore described is applicable generally when it is desired to effect the decomposition of a solid body of material at elevated temperatures, when the decomposition of such body is accompanied by the liberation of gas as a decomposition product. While it is applicable to especial advantage in the manufacture of lime where high temperatures of decomposition are necessary, it may also be applied in analogous arts, for instance in the manufacture of plaster of Paris ($CaSO_4.\frac{1}{2}H_2O$) from gypsum ($CaSO_4.2H_2O$), where the gypsum is dehydrated under the application of heat with the liberation of water vapor.

I claim:

1. A process of producing lime, which comprises forming a substantially uniform, relatively thin layer of limestone granules, indirectly heating the layer to a sufficiently elevated temperature to effect a complete decomposition of such granules into lime, and causing a vibration of such granules during decomposition.

2. A process of producing lime, which comprises forming a substantially uniform, relatively thin layer of limestone granules, indirectly heating said layer to sufficiently elevated temperature to effect a complete decomposition of such granules into lime, and during decomposition causing a vibration of such granules and reducing the carbon dioxide concentration adjacent to the granules.

In testimony whereof I have affixed my signature.

GUY H. HUNT.